Dec. 5, 1939.   F. L. PRUYN   2,182,095
FILTER BED CLEANING
Filed Sept. 29, 1938

INVENTOR
FRANCIS L. PRUYN
BY Louis L. Ansert
his ATTORNEY

Patented Dec. 5, 1939

2,182,095

UNITED STATES PATENT OFFICE 2,182,095

FILTER BED CLEANING

Francis L. Pruyn, Sea Girt, N. J.

Application September 29, 1938, Serial No. 232,393

8 Claims. (Cl. 210—128)

This invention relates to improvements in filter bed cleaning in filtration of liquids and more particularly to filter bed cleaning means adapted to travel along a downward flow filter bed of granular material such as sand and remove accumulated impurities.

Heretofore it has been proposed to clean filter beds of granular material by means of cleaners movable over said beds and comprising caissons or chambers with open bottoms engaging the upper surfaces of the filter beds, means for separating dirt and impurities from the granular material and means for discharging dirty liquid or water containing the dirt and impurities from the caissons. In many cases the separation of the dirt and impurities from the granular material of the filter bed has been effected by agitating the material of the filter bed and drawing up from the filter bed liquid containing the solids and impurities separated from the granular material and then withdrawing the dirty water from the caisson. More recently, however, it has been proposed to draw up granular material from the lower part of the filter bed to a level above the upper surface of the bed, where the granular material is discharged and allowed to fall in cleaned condition on the filter bed to the rear of the part being treated. In the lifting of the sand and discharge upon the top of the bed the same is washed and scoured. With these cleaners the sand is picked up from the lower part of the filter bed only and raised through suitable ducts or tubes. In this operation the sand settles to replace the sand removed at the bottom of the bed and in course of time the entire body of sand is lifted and cleaned.

An important object of the present invention is to provide novel and advantageous filter bed cleaning. Another object of the invention is to provide improved filter bed cleaning means. A further object of the invention is to provide a filter bed cleaner adapted for traveling along a filter bed and for raising by mechanical means all the granular material in the filter bed under the forward part of the filter bed cleaner above the normal level of the upper surface of the filter bed, and then discharging it on top of the filter bed to the rear of the mechanical lifting means, the granular material being washed and scoured during this transfer of the granular material.

According to one form of carrying out the invention, the filter bed cleaner comprises a caisson adapted to travel along the top of the filter bed and a mechanical conveyor arranged in the front part of the caisson so as to pick up the granular material in the bed and raise it to the upper part of the caisson well above the top of the filter bed and drop it on the filter bed to the rear of the conveyor. In this operation all of the material from the lower part of the bed to the top thereof is removed as the cleaner advances leaving a transverse trench or hole in the filter bed which is filled at the rear by the cleaned granular material as the caisson advances. During this transfer of the granular material the material is cleaned and scoured leaving the impurities in the dirty water which is withdrawn by suction from the caisson.

Each conveyor is preferably in the form of a belt carrying buckets which extend across the same. Preferably also the conveyor is inclined upwardly and rearwardly and the front wall of the caisson is correspondingly inclined so as to be parallel to the adjacent strip of the belt. It will be evident that with this arrangement there will be an upward flow between the conveyor and the front wall so that dirty water entering under the front wall of the caisson will be carried up to the upper part of the caisson thus facilitating removal of such dirty water from the caisson. Although use may be made of a single conveyor extending the width of the caisson it may be desirable to use a plurality of conveyors arranged side by side.

A filter bed cleaner of this kind may be used to clean filter beds of different shapes. Preferably, however, the cleaner is used in a channel of such width that the cleaner extends practically across the same and this channel may extend completely around the boundary or periphery of a settling tank which may be circular, rectangular or of any other suitable shape. In this arrangement of the filter bed channel around a tank, supernatent liquid from the upper part of the tank is passed into the filter bed channel above the filter bed and then downwardly through the filter bed into a suitable chamber or space from which it may be removed in any suitable manner.

Instead of having a conveyor of the belt type, a cleaner may be provided with a wheel or drum equipped with suitable buckets so that when the device is rotated the buckets will pick up the material from the bottom of the filter bed to the top thereof, and carry it up and rearwardly until it is discharged from the rotary device at the rear thereof. The granular material is scoured and washed during this transfer and then in clean condition falls on the bed while the dirty water containing impurities is drawn out of the top of the caisson or chamber. The movable buckets pass very close to the support or screen on which the filter bed rests and, if they strike the support or screen or its fastenings, parts of the cleaner or support may be damaged. In order to avoid damage of this kind the buckets may be provided at their edges with yielding portions of material such as rubber.

Other objects, features and advantages will appear upon consideration of the following detailed description in which.

Figure 1:
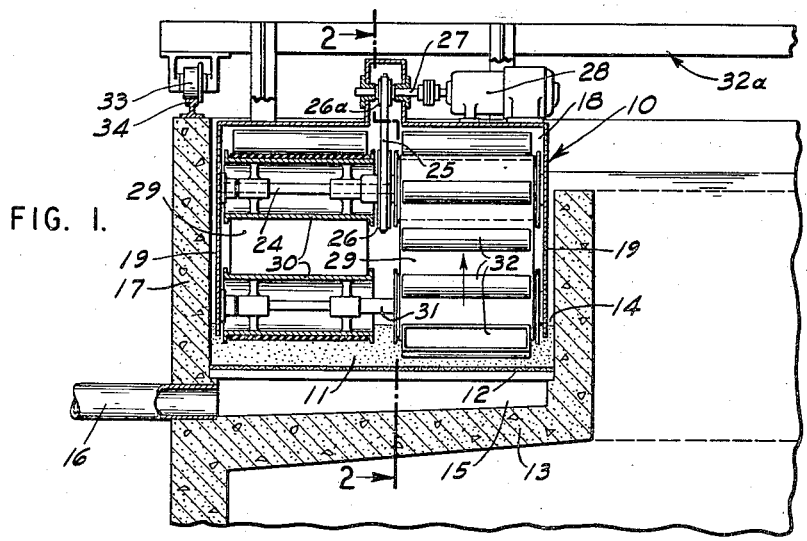
Fig. 1 is a fragmentary view partly in section of apparatus equipped with one form of the filter bed cleaner embodying the present invention.
Figure 2:
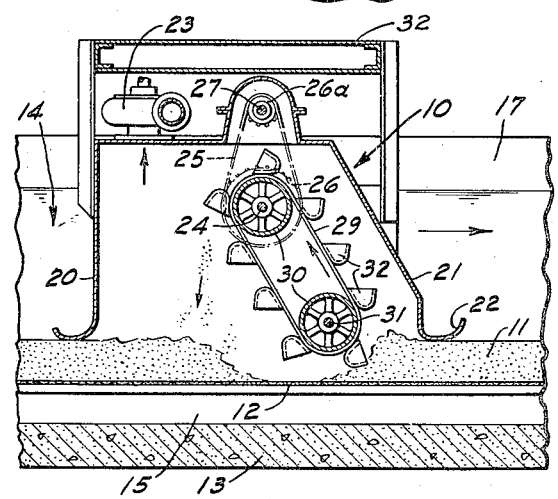
Fig. 2 is a section taken along the line 2—2 of Fig. 1.

Referring to Figs. 1 and 2, a filter bed cleaner 10 embodying one form of the present invention is illustrated in connection with a filter bed 11 of suitable granular material, such as sand, resting on a support or screen 12. Said support 12 may be spaced from the bottom 13 of a channel or tank 14 containing a filter bed, so as to provide beneath the filter bed 11 a liquid compartment or chamber 15 from which liquid may be discharged as desired as through one or more pipes 16, the discharge being controlled so as to determine the difference in head acting to pass the liquid in the filter channel through the filter bed. The filter tank or channel 14, may be of any suitable shape, the cleaner being so supported and moved over the filter bed so as to clean all of the filter bed in the tank or channel. Frequently the filter channel or tank 14 extends around a settling tank of which only the side wall 17 is shown, which settling tank may be of any suitable shape as for example, circular or rectangular. With this arrangement, it is particularly desirable to have the cleaner 10 extend completely across the tank or channel 14. As illustrated, the filter channel extends around the settling tank just inside the wall 17.

The filter bed cleaner 10 is illustrated in Figs. 1 and 2 as comprising a caisson or chamber 18 open at its bottom which rests upon the filter bed 11 and includes side walls 19 engaging the filter bed 11 to effect a substantial seal therewith, a rear wall 20 curved rearwardly and upwardly at its lower edge to smooth the part of the filter bed just cleaned and to maintain an effective seal with the upper surface of said filter bed, and a front wall 21 of which the lower edge is turned forwardly and upwardly to provide a forwardly extending upturned lip 22 which serves to depress the sand and waste solids so that they will pass under the lower edge of said front wall. For convenience, the direction of movement of the cleaner is indicated by an arrow in Fig. 2.

According to the present invention, the sand beneath the caisson is cleaned during the forward movement of the caisson by mechanical means which raises all of the sand under the front of the caisson to a level above the normal surface of the filter bed and then discharges it into the caisson so that it may pass through the water in the caisson and be deposited on the top of the filter bed to the rear of the mechanical means by which it was lifted from the filter bed. During this shifting of the sand of the filter bed the accumulated solids or impurities are washed or scoured from the sand, thus producing dirty liquid or water in the caisson. This dirty water may be removed by any suitable means such as a suction pump 23 at the top and rear of the caisson and connected at its suction side with the interior of the caisson.

The mechanical means for conveying or elevating the sand may comprise one or more conveyors preferably inclined upwardly and rearwardly and located near the front of the caisson, the front wall 21 of the caisson being inclined in a corresponding manner. As illustrated in Figs. 1 and 2 there are two conveyors driven through a common shaft 24 at the upper ends thereof, this shaft being actuated through a sprocket chain 25 passing over a sprocket wheel 26 on said shaft 24 and a sprocket wheel 26a on a shaft 27 driven by a motor 28, the sprocket wheel 26a and the upper part of the chain 25 being enclosed in an upwardly projecting portion of the top of the caisson 18. Each of the inclined conveyors may comprise a belt 29 passing around drums 30 on the upper shaft 24 and a lower shaft 31 and suitable buckets 32 mounted on the belt 29.

The caisson 10 may be supported and moved along a filter bed in any suitable manner but, as illustrated in Figs. 1 and 2, it is supported in the filter channel 14 from a rotating bridge 32a supported at its outer end by one or more wheels 33 running on a rail 34 on the top of the wall 17 and pivotally supported at the center of the tank 30 in any suitable manner (not shown).

In operation the filter bed cleaner 10 advances in the direction indicated by the arrow in Fig. 2 and as the cleaner advances the dirty or contaminated granular material or sand at the forward side of the caisson is picked up by the buckets 32 of the two conveyors, carried or elevated to the upper part of the caisson, and then dumped at the rear of the conveyors. The sand thus dumped settles through the liquid, while being washed and scoured, and is deposited at the rear of the conveyors to provide a clean portion of the filter bed. The upward movement of the buckets 32 in the front part of the caisson may cause dirty water entering the caisson under the front wall 21 to flow upwardly to the upper part in the caisson in position for removal by pump 23. During operation of the conveyors the sand is removed substantially down to the support or screen 12 and filtered liquid may be drawn back through the support 12 to clean the sand.

Figure 3:
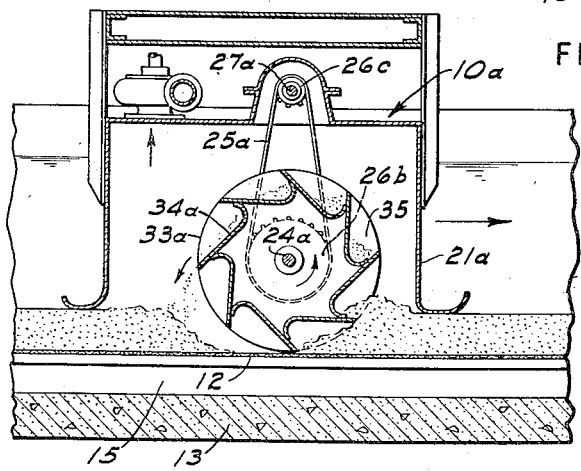
Fig. 3 is a view similar to Fig. 2 illustrating a second embodiment of the invention.

In Fig. 3 there is illustrated a second form of cleaner 10a embodying the present invention. In this form the conveying or elevating of the granular material or sand is effected by a rotary device mounted on a shaft 24a driven through a sprocket wheel 26b thereon and a sprocket chain 25a passing around the sprocket wheel 26b and a sprocket wheel 26c carried by a shaft 27a. Shaft 27a may be driven in the same manner as the shaft 27 of Figs. 1 and 2.

The rotary conveying device may be of any suitable form but, as illustrated comprise end members or discs 33a mounted on shaft 24a to rotate therewith and connecting members 34a cooperating with each other and discs 33a to provide buckets or pockets 35. The connecting members 34a may be in the form of plates each having a substantially flat portion, extending inwardly from the circumferences of the discs 33a and rearwardly with reference to the direction of rotation, and an outwardly curved rearward portion spaced inwardly from the circumferences of the discs and cooperating with the flat portion of the next member or plate to form a pocket.

In operation the granular material will be scooped up, from the bottom to the top of the filter bed, and after passing over the top of the rotary device will be discharged and deposited at the rear on the filter bed or in the hole or transverse trench formed by the action of the rotary device, the trench traveling with the rotary conveying or elevating device. During its transfer from front to rear the granular material will be washed and scoured. The resulting dirty water may be removed from the caisson in the usual manner.

Figure 4:
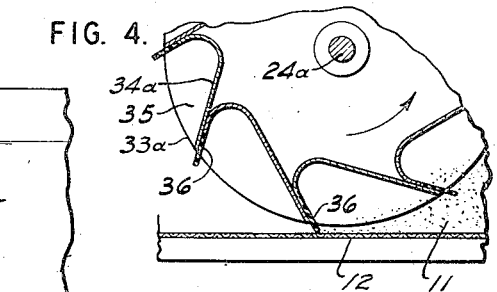
Fig. 4 is a fragmentary view illustrating another modification of the present invention.

In the operation of the device illustrated in Fig. 3 there is danger of damage due to engagement by the members 34a with the support 12 or its fastenings. However, as illustrated in Fig. 4, such damage may be avoided, by spacing the rotary device from the support 12 and providing each member 34a at its edge at the circumference of the discs 33 with a yielding strip 36, of any suitable material such as rubber. As a result of the use of such strips 36, the upper surface of the support may be cleaned much more effectively and without danger to the apparatus.

It should be understood that various features may be changed and that certain features may be used without others, without departing from the true spirit and scope of the invention.

What I claim is:

1. In a filter bed cleaner adapted for movement over the granular bed of a downward flow filter for liquids, the combination with a caisson having an open bottom engaging the upper surface of said bed and means to withdraw dirty liquid from said caisson, of mechanical means in said caisson to pick up granular filter bed material beneath said caisson, raise it above the level of the upper surface of the filter and discharge it rearwardly in said caisson at a level above that of the upper surface of the filter bed, the granular material settling on the filter bed in cleaned condition and the solids removed from the granular material remaining in suspension in the dirty water above the bed.

2. In a filter bed cleaner adapted for movement over the granular bed of a downward flow filter for liquids, the combination with a caisson having an open bottom engaging the upper surface of said bed and means to withdraw dirty liquid from said caisson, of a conveyor in said caisson to pick up granular filter bed material beneath the caisson, raise it in said caisson above the level of the upper surface of the filter bed and discharge it rearwardly in said caisson above the level of the upper surface of the filter bed, the solids carried by the granular material being retained in the dirty liquid while the granular material settles on the filter bed.

3. In a filter bed cleaner adapted for movement over the granular bed of a downward flow filter for liquids, the combination with a caisson having an open bottom engaging the upper surface of said bed and means to withdraw dirty liquid from said caisson, of mechanical means in said caisson including an endless series of devices in said caisson acting successively during the travel of the cleaner to pick up in said caisson granular material of the filter bed from the bottom to the top thereof, raise it above the level of the upper surface of the filter and discharge it inside the caisson and at the rear of said mechanical means and above the level of the upper surface of the filter bed, the granular material settling and being deposited in cleaned condition on the filter bed and the contaminating solids being retained in suspension in the dirty liquid and withdrawn therewith from the caisson.

4. In a filter bed cleaner adapted for movement over the granular bed of a downward flow filter for liquids, the combination with a caisson having an open bottom engaging the upper surface of said bed and means to withdraw dirty liquid from said caisson, of a conveyor in said caisson comprising a conveyor belt with devices thereon to pick up granular filter bed material from the bottom to the top of the bed, elevate the material at the front of the conveyor to a level above the upper surface of the filter bed, and discharge the material inside said caisson above the level of the upper surface of the filter bed, whereupon the granular material will settle and be deposited in cleaned condition on the filter bed, the contaminating solids discharged with the granular material being retained in suspension in the dirty liquid and withdrawn therewith from the caisson.

5. In a filter bed cleaner adapted for movement over the granular bed of a downward flow filter for liquids, the combination with a caisson having an open bottom engaging the upper surface of said bed and means to withdraw dirty liquid from said caisson, of a conveyor in said caisson comprising a rotary member with devices thereon to pick up granular filter bed material from the bottom to the top of the bed, elevate the material at the front of the conveyor to a level above the upper surface of the filter bed, and discharge the material inside said caisson above the level of the upper surface of the filter bed, whereupon the granular material will settle and be deposited in cleaned condition on the filter bed, the contaminating solids discharged with the granular material being retained in suspension in the dirty liquid and withdrawn therewith from the caisson.

6. In a filter bed cleaner adapted for movement over a downward flow filter bed of granular material on a support, the combination with a caisson having an open bottom engaging the upper surface of said bed and means to withdraw dirty liquid from said caisson, of a conveyor comprising an endless series of devices to pick up granular filter bed material from the surface of the support to the top of the bed, elevate the material at the front of the conveyor to a level above the upper surface of the filter bed, and discharge the material above the level of the upper surface of the filter bed, whereupon the granular material will settle and be deposited in cleaned condition on the filter bed, the contaminating solids discharged with the granular material being retained in suspension in the dirty liquid and withdrawn therewith from the caisson, said devices having yieldable portions to avoid damage to the support.

7. In a filter bed cleaner adapted for movement over the granular bed of a downward flow filter for liquids, the combination of a caisson having an open bottom engaging the upper surface of said bed, said caisson having a forward and downwardly inclined front wall, and means to withdraw dirty liquid from said caisson, of an endless conveyor having a forward reach parallel to the front wall of the caisson and comprising a series of devices to pick up material from the bottom to the top of the filter bed, carry it upwardly to a level above the upper surface of the filter bed and discharge it so that it will settle through the liquid in the caisson and be deposited on the bed at the rear of the conveyor, the contaminating solids carried upwardly and discharged with the granular material being retained in suspension in the dirty liquid, dirty liquid entering the caisson beneath its front wall being passed upwardly between the front wall of the caisson and the conveyor to a level where it may conveniently be withdrawn from the caisson.

8. In a filter bed cleaner adapted for movement over the granular bed of a downward flow filter for liquids, the combination with a caisson having an open bottom engaging the upper surface of said bed and means to withdraw dirty liquid from said caisson, of a plurality of conveyors inside said caisson, said conveyors extending across said caisson and acting to pick up the granular material of the filter bed, raise it above the level of the upper surface of the filter and discharge it inside said caisson above the level of the upper surface of the filter bed, whereupon the granular material will settle and be deposited in cleaned condition on the filter bed, the contaminating solids discharged with the granular material being retained in suspension in the dirty liquid and withdrawn therewith from the caisson.

FRANCIS L. PRUYN.